United States Patent [19]

Resnicow

[11] 4,274,323
[45] Jun. 23, 1981

[54] SHAFT-MOUNTED ASSEMBLY

[76] Inventor: Herbert Resnicow, 107 Weeks Rd., East Williston, Long Island, N.Y.

[21] Appl. No.: 37,200

[22] Filed: May 8, 1979

[51] Int. Cl.³ ............................................. F16B 43/00
[52] U.S. Cl. ................................. 411/433; 411/427; 411/437; 411/516; 411/533; 411/539
[58] Field of Search ........................... 85/32 R, 33, 51

[56] References Cited

U.S. PATENT DOCUMENTS

| 1,062,000 | 5/1913 | Hahn | 85/33 |
|---|---|---|---|
| 1,241,432 | 9/1917 | Peltz | 85/33 |
| 1,360,297 | 11/1920 | Jensen et al. | 85/33 |
| 1,406,804 | 2/1922 | Alexander | 85/33 |
| 1,452,492 | 4/1923 | Carpenter | 85/33 |
| 1,607,873 | 11/1929 | Crowder | 85/33 |
| 2,374,309 | 4/1945 | Roxs | 85/33 |
| 2,377,581 | 6/1945 | Shaffrey | 85/33 |
| 3,491,647 | 1/1970 | Frazier | 85/51 |
| 3,618,828 | 11/1971 | Jessmore | 85/33 |

*Primary Examiner*—Casmir A. Nunberg
*Attorney, Agent, or Firm*—Baker & McKenzie

[57] ABSTRACT

An assembly which may be mounted on a shaft such as a rod, bolt, or the like. The assembly includes a first member which comprises at least two segments and a retainer or locking member which interlocks with the segments when the segments are placed around the shaft to retain the segments on the shaft. The retainer also comprises at least two segments such that the first member can be used on a shaft on which the ends are non accessible.

In the illustrated embodiments, the first member is a nut, and, after positioning on the shaft, the nut can be rotated and tightened in the manner of any conventional nut.

15 Claims, 23 Drawing Figures

U.S. Patent  Jun. 23, 1981  Sheet 1 of 5  4,274,323
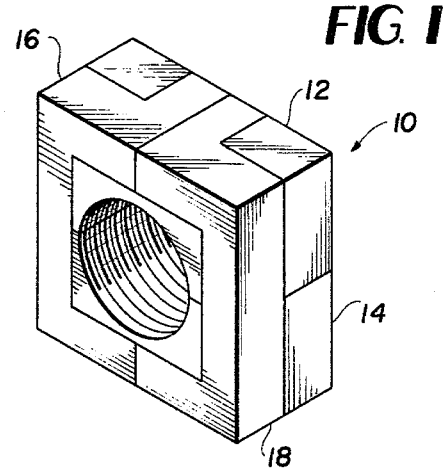
FIG. 1
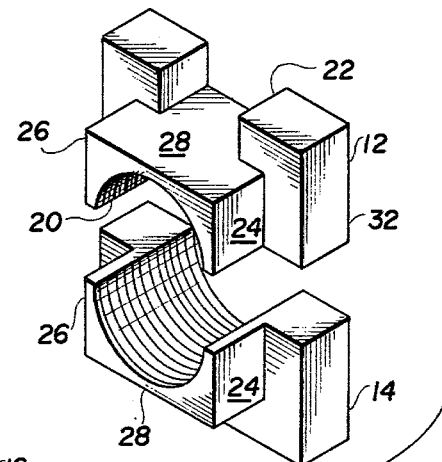
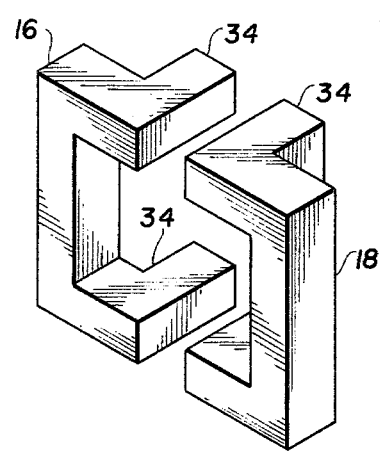
FIG. 2
FIG. 4
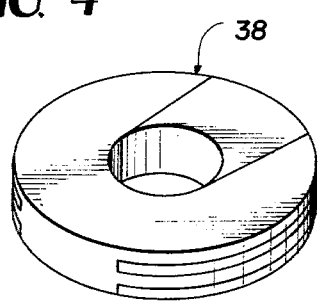
FIG. 5
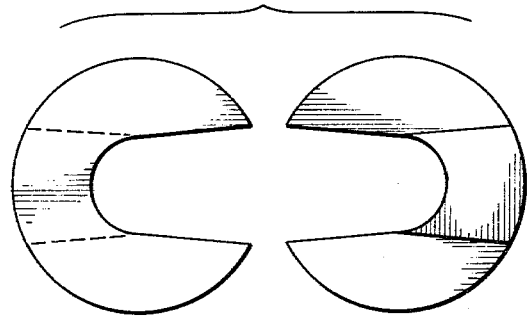
FIG. 6
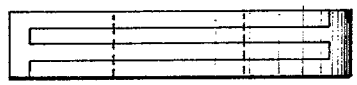
FIG. 7

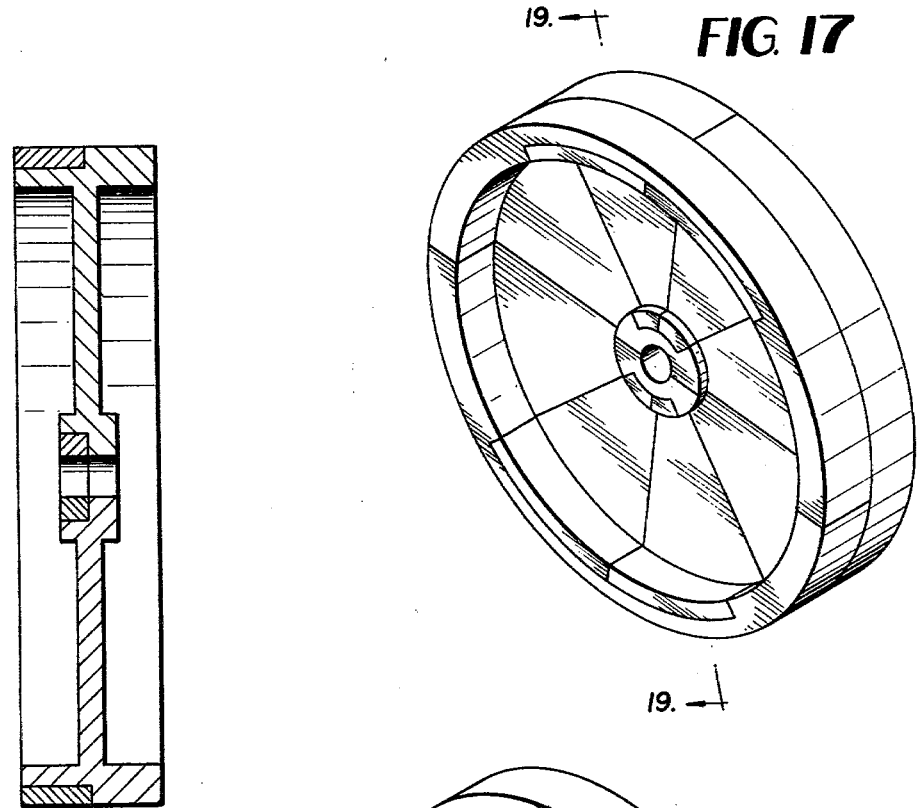
FIG. 17
FIG. 19
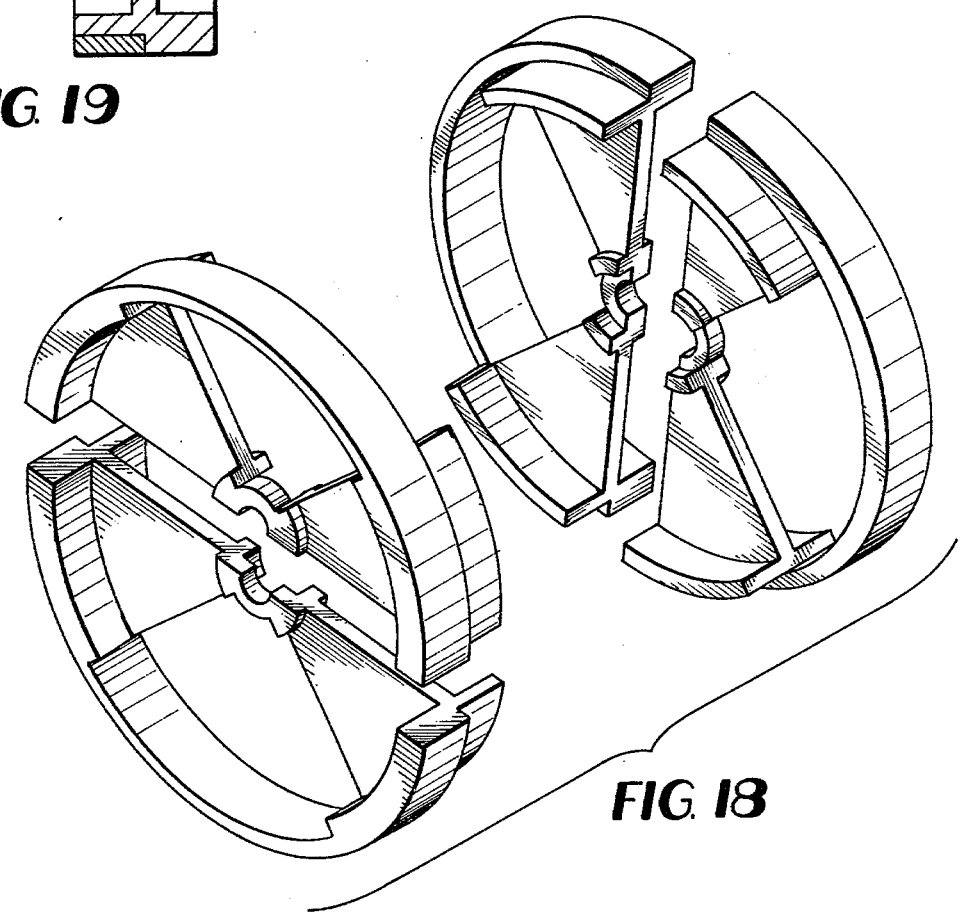
FIG. 18

FIG. 20
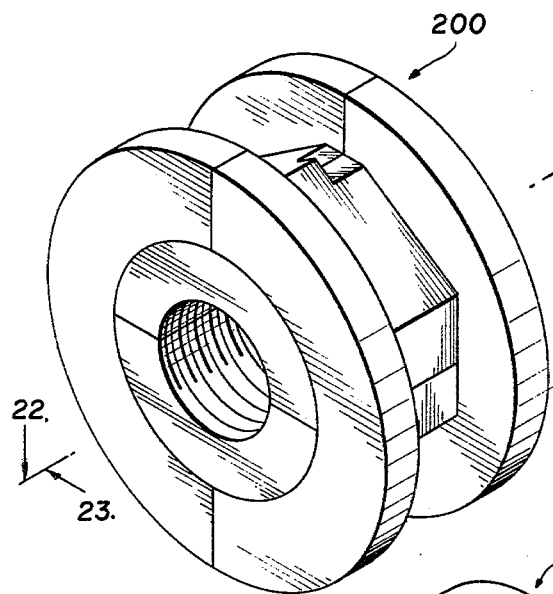
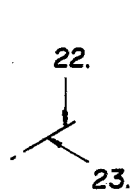
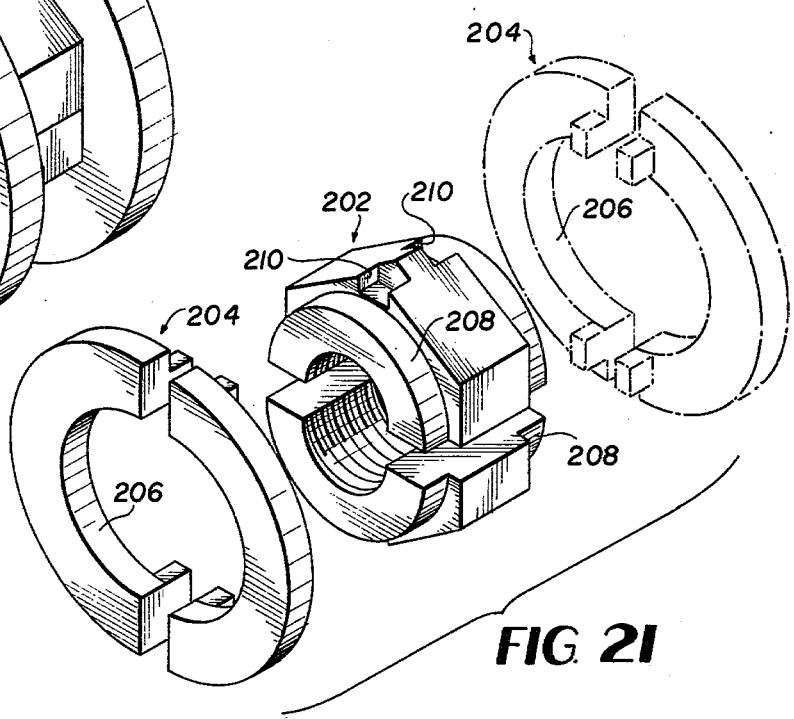
FIG. 21
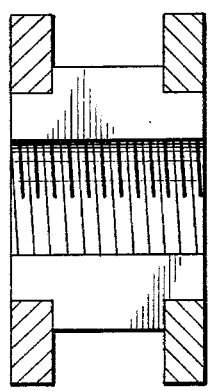
FIG. 22
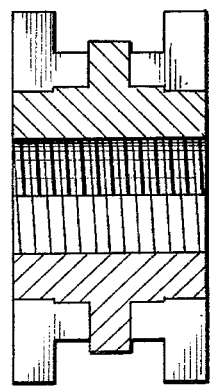
FIG. 23

SHAFT-MOUNTED ASSEMBLY

FIELD OF THE INVENTION

This invention relates to an assembly which is to be mounted on a shaft. In its preferred embodiment, it relates to a nut for a threaded member such as a rod, bolt, sleeve, or the like. More particularly, this invention relates to a nut which may be quickly applied to or released from a threaded member and which may be placed in position on a threaded member irrespective of the accessibility of the ends of the threaded member or intervening assemblies on the threaded member.

BACKGROUND OF THE INVENTION

The purpose of this invention is to provide an assembly which can be quickly mounted on a shaft without passing over the ends of the shaft. More particularly, a preferred purpose of this invention is to provide a nut which can be quickly fastened to or released from a threaded member without the need for passing the nut over the free end of the threaded member and/or removing other assemblies from the threaded member.

In conventional nut and bolt assemblies, the nut is passed over the free end and threaded into position to secure a member between the head of the bolt and the nut. Others in the prior art have sought ways to expedite the assembly of the nut onto the threaded member. In U.S. Pat. No. 1,406,804 to W. S. Alexander dated Feb. 14, 1922, entitled QUICK RELEASABLE NUT AND BOLT, an internally threaded nut is split into two segments which may be readily placed in mating relationship with the external threads on a bolt at any point intermediate the length of the bolt. The threaded segments are held in position by means of a unitary retaining member which has wedge shaped surfaces which engage and interact with wedge surfaces on the segments so that when the bolt is tightened the retainer is forced into surrounding engagement with the segments to maintain the segment in place. In that device, however, the retainer member is unitary and must be slid over the free end of the bolt. Therefore, the Alexander nut is not usable with threaded members where there is no accessible free end.

The nut of this invention consists of two or more internally threaded segments which, when placed together around a threaded member, function as a conventional nut. A retainer member is employed and is also split into at least two segments so that it too may be placed around a threaded member intermediate its length without having to first be passed over the free end thereof. There are many instances where it is desirable to place a nut on a threaded member intermediate its length wherein the free ends are not accessible or if they are accessible they already have nuts or other assemblies at other positions thereon which normally would have to first be removed. The nut of this invention obviates those problems and results in substantial time savings.

In its broader aspects, this invention may be termed an assembly which is to be secured to a shaft intermediate its ends. In this aspect, the assembly comprises four or more interlocking parts which can be assembled around the shaft. In this aspect, the shaft need not be threaded or circular in cross-section, and the assembly can be, for instance, a bearing.

SUMMARY OF THE INVENTION

In a preferred embodiment of this invention, two internally threaded segments are provided which, when placed in assembled relationship, assume the general configuration of a conventional nut designed to be threaded onto a threaded member such as a bolt, rod, or the like. The outer configuration of each segment is polygonal, and each segment includes a pair of side walls and a top surface. Each of the segments is provided with a flange extending from the side and top walls along the edge portions thereof and having a notch in that portion in the top wall. The side wall and top wall and flange define a seat or channel for a retaining member in the form of two generally "C"-shaped members each having projections attached to and extending at right angles from the free ends of the C-shaped members. The pair of C-shaped members are designed to be received in the seat or channel defined by the flanges, side walls and the top walls of the split threaded segments, and the projections of the C-shaped members are designed to be received in the notches in the flanges on the top surfaces of the segments.

In assembly, the segments are placed around a threaded member, so the threads are made to be continuous and to accurately mate with the threaded member such that the assembly can be turned on the bolt as any conventional nut. The retainer member, which is comprised of the two C-shaped segments, is placed in opposed, facing relationship to enclose the threaded member between the head thereof and the object to be secured with the free end members of the C-shaped members abutting each other and the projections running along side each other. The retainer member is then slid axially into position with the C-shaped members surrounding the threaded segments, and the retainer member is retained in that position by means of the projections which are received in the grooves in flanges which extend around the segments. Because of their interlocking relationship, the several parts hold each other together, especially under load.

In other embodiments of this invention disclosed herein, the nut takes on various other specific shapes, and in some embodiments the assembly is not a nut. The common feature, however, is that the interrelationship of the four or more components of the assembly permits the assembly to be rapidly and easily mounted on a shaft without passing over the ends of the shafts.

OBJECTIVES

It is the broad objective of this invention to provide an assembly which can be quickly mounted on a shaft without passing over the ends of the shaft.

It is a specific objective of this invention to provide a nut which may be quickly attached to and released from a threaded member without passing over the ends of the threaded member.

It is a further objective of this invention to provide a nut which may be placed on a threaded member intermediate its length without having to first be passed over a free end thereof.

It is a further objective of this invention to provide a nut which is capable of ready disassembly but which will be firmly retained in assembled relationship when in use.

BRIEF DESCRIPTION OF THE DRAWINGS

These and other objects of the invention will become more apparent to those skilled in the art by reference to the following detailed description when viewed in light of the accompanying drawings wherein:

FIG. 1 is a perspective view of a first embodiment of the nut of this invention in assembled relationship;

FIG. 2 is a perspective view of the first embodiment of the invention showing the elements thereof in disassembled relationship;

FIG. 4 is a perspective view of a third embodiment of this invention;

FIG. 5 is an exploded planar view of the components of the third embodiment of this invention;

FIG. 6 is a side view of the third embodiment of this invention;

FIG. 7 is an exploded side view of the components of a fourth embodiment of this invention;

FIG. 17 is a perspective view of a ninth embodiment of this invention;

FIG. 18 is an exploded perspective view of the ninth embodiment of this invention;

FIG. 19 is a cross-sectional view of the ninth embodiment of this invention;

FIG. 20 is a perspective view of a tenth embodiment of this invention;

FIG. 21 is an exploded perspective view of the tenth embodiment of this invention;

FIG. 22 is a view along the line 22—22 in FIG. 20;

FIG. 23 is a view along the line 23—23 in FIG. 20.

DETAILED DESCRIPTION OF THE PRESENTLY PREFERRED EMBODIMENTS OF THE INVENTION

First Embodiment

Figure 3:
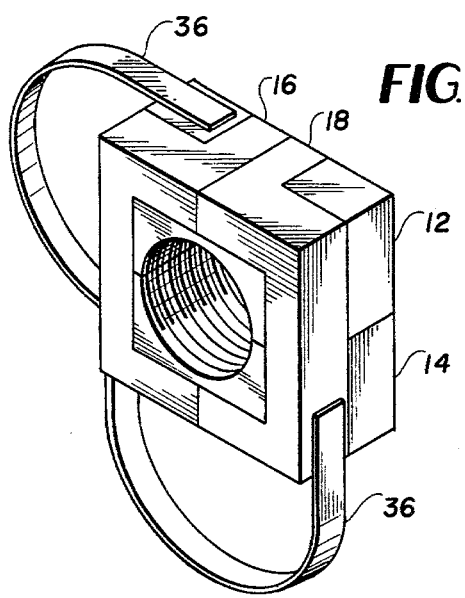
FIG. 3 is a perspective view of a second embodiment of the nut of this invention in which the segments thereof are provided with retaining means.

Referring now to FIGS. 1 and 2, the nut of the first embodiment of this invention is generally indicated by the numeral 10. It includes threaded segments 12 and 14 and retainer elements 16 and 18, which are identical. The threaded segments 12 and 14 are identical externally, but differ internally by reason of the continuous threads. The segments 12 and 14 when assembled resemble a conventional nut, and the threads 20 on the inner surfaces thereof are continuous for mating relationship with a threaded bolt, rod, or other threaded member. Segments 12 and 14 may be formed in any convenient manner, either before or after forming locking grooves 22.

Each segment 12, 14 has short walls 24 and 26 and a long wall 28. A flange 32 extends outwardly from the walls of each segment and is formed with locking grooves 22 in the portion which extends from the long wall 28. The walls 24, 26, 28 and the flange 32 define a seat which receives the retainer elements 16 and 18 now to be described.

The two identical elements 16 and 18 are adapted to encircle the threaded segments 12 and 14 to secure the latter to a threaded member. The elements 16 and 18 which make up the retaining member are C-shaped members each having projections 34 extending outwardly from and at right angles to the free end portions of the C-shaped members as clearly shown in FIG. 2. When the C-shaped members are faced toward each other as shown in FIG. 2 and are then moved together such that the free end portions and the projections 34 are in abutting relationship, a rectangular tongue is defined which is sized and shaped to be received closely in the locking grooves 22 when the segments 12 and 14 are assembled around a threaded member.

The interaction of the elements can best be understood by reference to the manner in which the nut is assembled onto a threaded member.

First, the segments 12 and 14 are placed one on top of the other in the manner shown in FIG. 2 and then are pushed together to surround the threaded member to which the segments are to be secured. It is, of course, understood that when the segments are assembled, the threads 20 are continuous and accurately mate with the threads on the threaded member. The segments can be assembled close to the object to be secured, a primary feature of this invention. Further, the elements can be secured to the threaded rod irrespective of the fact that the free ends of the rod may be inaccessible.

Next, the retainer elements 16 and 18 are placed in a similar relationship about the threaded member, preferably between the object to be secured (in other words toward the head of the bolt, for example) and the nut. The elements 16 and 18 are then pushed axially toward the segments 12 and 14 until the projections 34 are received in the locking grooves 22 and the C-shaped members are received in the seat formed by the side walls 24 and 26, top and bottom walls 28 and flanges 32 of the segments 12 and 14.

The nut is shown in an assembled relationship in FIG. 1. The nut as assembled can now be tightened in the manner of a conventional nut. Since the segments 12 and 14 are locked to the threaded member by means of its threaded engagement therewith, and since the retaining elements 16 and 18 will tightly abut the object to be secured, the nut will stay in assembled relationship.

It will, of course, be appreciated that the projections 34 can also be tapered in one or two planes, that they may be curved, and that they can go partly through or into a locking groove which does not go all the way through the flange on the threaded segments. Moreover, the tongue-in-groove may be reversed—that is, tongues can be put on the threaded segments 12 and 14 and locking grooves can be put on the retainer elements 16 and 18.

Second Embodiment

To more readily handle the individual elements of this invention, the two retainer elements 16 and 18 and the two threaded segments 12 and 14 may be loosely joined together by means of spring-like member 36 as shown in FIG. 3. The purpose of these members is merely to facilitate the handling of the individual elements of the nut.

Third Embodiment

A split washer 38, which may be used in conjunction with the split nut shown in FIGS. 1 through 3 or for other purposes, is shown in FIGS. 4 through 6. Like the split nut, the split washer can be placed on a bolt, threaded rod, or other shaft without passing over an end of the shaft. Like the split nut, it comprises two identical (or more than two similar) parts which when placed together form a washer which will hold together under bending, as shown in FIGS. 4 through 7. Note that washers composed of an even number of layers (e.g., the four-layered washer shown in FIGS. 4 and 6) are completely symmetrical and only one type need be made to make a fit, while washers composed of an odd number of layers (e.g, the three-layered washer shown in FIG. 7) comes in lefts and rights.

This embodiment of the invention is not limited to split washers per se. Bushings, spacers, and similar components can be formed in the same fashion. They may be made by cutting and fastening as described above, or they may be made in one piece, and they may be made of metal, plastic, or any other materials according to requirements. They can even be made of a variety of materials for special needs, such as a layer of resilient material between layers of stiff material or a layer of soft material to press against a face which should not be scratched, etc.

Fourth Embodiment

The split washer shown in FIG. 7 is similar to the split washer shown in FIGS. 4 thru 6 except that it has an odd number of layers (namely, three) rather than an even number. Such a split washer will also hold together under bending, and each segment of the split washer requires fewer machinery steps (or is simpler to mold, if molded). However, the two segments are not identical, and left and right segments must be fabricated and stocked.

Fifth Embodiment

Figure 8:
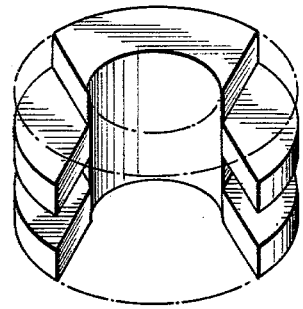
FIG. 8 is a perspective view of a fifth embodiment of this invention.
Figure 9:
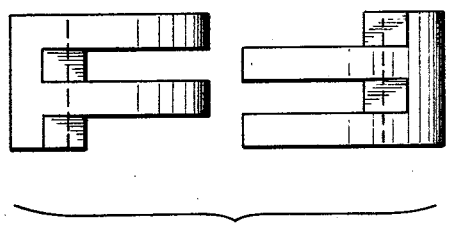
FIG. 9 is an exploded side view of the components of the fifth embodiment of this invention.

FIGS. 8 and 9 show a bushing manufactured on the same general principal as the split washers shown in FIGS. 4 through 7. This bushing design is particularly advantageous because it can be installed in its own length, facilitating quick installation and release in close quarters. Of course, the inner surface of this unit can be threaded, making this embodiment into a split nut.

Sixth Embodiment

Figure 10:
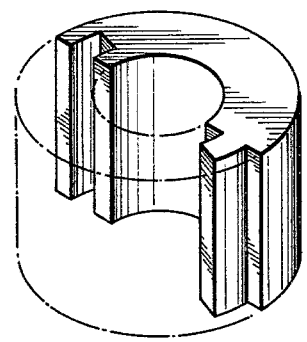
FIG. 10 is a perspective view of a sixth embodiment of this invention showing one component in solid line and one component in phantom line.
Figure 11:
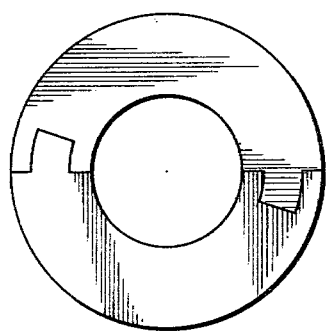
FIG. 11 is a planar view of the sixth embodiment of this invention.

FIGS. 10 and 11 show another bushing manufactured on the same general principal. Since the prongs and grooves are concentric circular arcs, they must be slid together axially rather than radially, which requires a space of double the unit's length.

Seventh Embodiment

Figure 12:
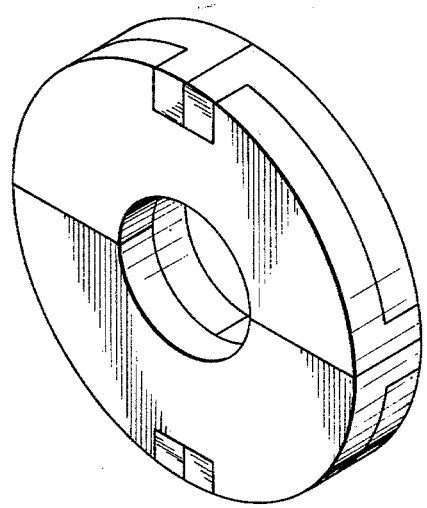
FIG. 12 is a perspective view of a seventh embodiment of this invention.
Figure 13:
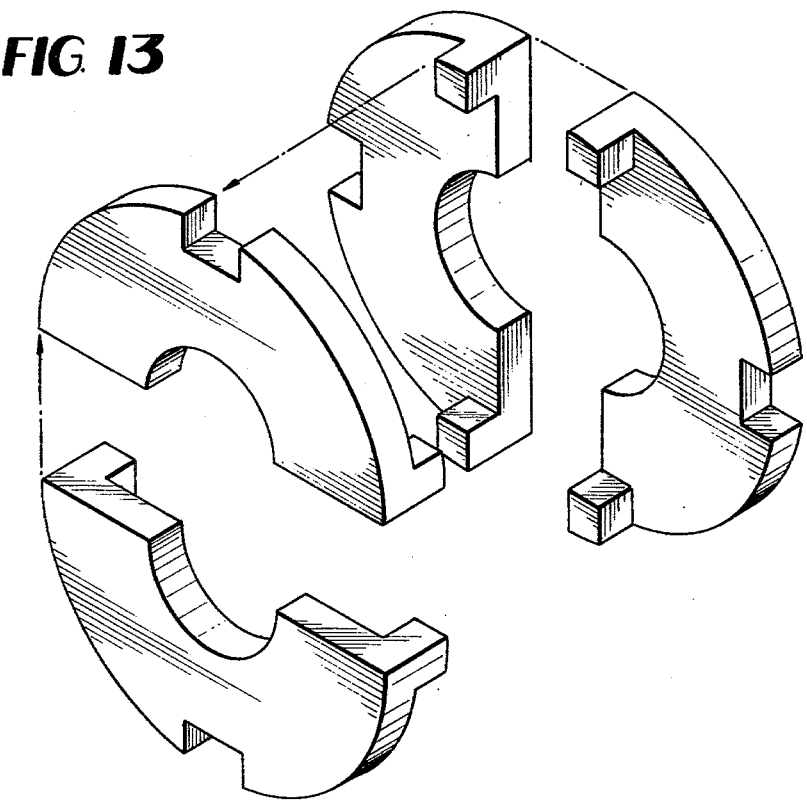
FIG. 13 is an exploded perspective view of the seventh embodiment of this invention.

FIGS. 12 and 13 show a split washer fabricated on the same general principal as the split nut shown in FIGS. 1 and 2. It is composed of four identical components which interlock to maintain themselves in assembled relationship, particularly under loads, without the need for external holding means, as is the case with the embodiments shown in FIGS. 4 through 9. The interlock is, of course, preferably maintained when the parts are not under load by fabricating the parts to insure a light pressure fit, by the provision of adhesives between the parts during assembly, or the like.

Eighth Embodiment

Figure 14:
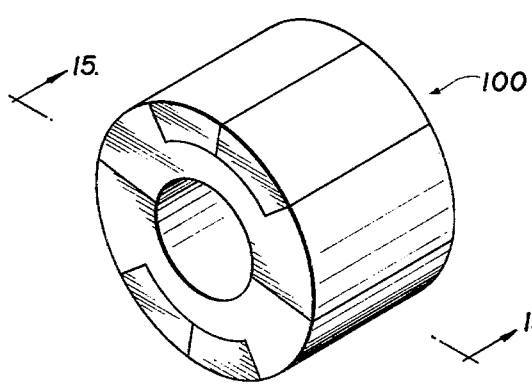
FIG. 14 is a perspective view of an eighth embodiment of this invention.
Figure 15:
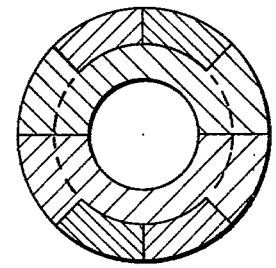
FIG. 15 is a cross-sectional view along the line 15—15 in FIG. 14.
Figure 16:
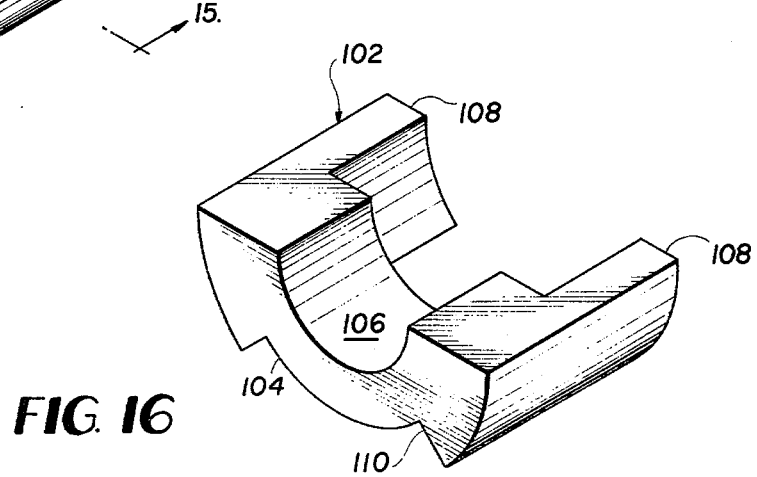
FIG. 16 is a perspective view of one of the components of the eighth embodiment of this invention.

FIGS. 14–16 show a split sleeve which may be used as a bushing, spacer, bearing, collar, etc. This embodiment is also composed of four identical components which interlock to maintain themselves in assembled relationship, but the shape of the individual components is different than that of the split nut shown in FIGS. 1 and 2 and the split washer shown in FIGS. 12 and 13. In this embodiment, all four segments interface with the shaft.

The split sleeve 100 shown in FIGS. 14 through 16 comprises four identical members 102 (shown in FIG. 16). Each member 102 comprises a body 104 defining half of the inner circumferential surface 106 (i.e., the surface adjacent the shaft) over half the axial length of the split sleeve 100, circumferentially spaced exterior tongues 108 projecting from the body 104, and an exterior groove 110 sized and shaped to receive one exterior tongue 108 from each of two mating members 102. In use, each of the tongues 108 on each member 102 are received in a groove 110 of a different member 102, and each groove 110 receives two tongues 108, one from each of two different members 102. The net effect of the interlocking is to hold the four members 102 in assembled relationship, particularly if the parts are sized for a light pressure fit.

As will be readily appreciated, the split sleeve construction shown in FIGS. 14 through 16 can be readily keyed to a shaft with an axial key or splines. Also, the same general principal (i.e., the provision of two tongues and a single groove on each part) can be used with non-identical parts—that is, each segment does not have to define one-quarter of the total shaft interface, etc. and the tongues and grooves could be interior (i.e., adjacent the shaft) rather than exterior.

Ninth Embodiment

FIGS. 17 through 19 show the principal of the split sleeve shown in FIGS. 14 through 16 applied to a split wheel, pulley, gear, etc. This assembly differs from that shown in FIGS. 14 through 16 in that there are two separate and independent interlocks, one at the hub and one at the wheel. The two interlocks are not identical in that the inner pair is the opposite hand radially speaking, from the outer pair. Each interlock, however, is identical in principal to the single interlock shown in the previous embodiment.

Tenth Embodiment

FIGS. 20 through 23 show a split nut-split washer assembly 200 which can be given extra strength by providing for the use of two washers, one on either side of the split nut. The relationship between the split nut 202 and each split washer 204 is similar to that of the assembly shown in FIGS. 12 and 13, but it differs in one very important respect: the radially inner surfaces 206 of the split washers 204 engage the radially outer surfaces 208 of the split nut 202. Accordingly, in a situation where the ends of the shaft are accessible, it is possible to replace the split washers 204 with conventional unitary washers having the requisite inner diameter.

This embodiment is used in the case where the axial load is so great that it is necessary to apply two or more split nut assemblies in tandem. In this case, it is desirable to put a second split washer on the "free" (non-load) end of the split nut, since it would help resist the radial forces and it would be held in place by the second split nut assembly, which in turn would have only one split washer on the load end. The non-load end split washer, of course, would simply come off if not held in place.

Of course it should be noted that a single split washer 204 can be used with the split nut 202 while retaining the advantage of the mating of the surfaces 204 and 206. In this configuration the split nut 202 could be made with grooves 210 on only one axial face, but it is preferably made with grooves 210 on both axial faces in order to make the two halves of the split nut interchangeable.

CAVEAT

While the present invention has been illustrated by detailed descriptions of several presently preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. An assembly which may be mounted on a shaft without passing over the end of the shaft, said assembly comprising four segments which are sized and shaped to encircle the shaft and which interlock with each other, each of said four segments having two radially spaced pairs of projecting tongues and two radially spaced grooves, each of which is sized and shaped to receive a projecting tongue from each of two of the other segments, thereby interlocking all four segments in two radially spaced places.

2. The assembly of claim 1 wherein:
(a) two of said segments have a body which defines part of a bore for the reception of the shaft and an external flange in which one of said grooves is formed and
(b) the other two of said segments each have one of said pairs of projecting tongues sized, shaped, and positioned so that each one of said projecting tongues from each of said other two of said segments is received in said groove in said flange on said first two of said segments, said other two of said segments having a body which defines part of a bore for the reception of said bodies of said first two of said segments.

3. The assembly of claim 2 wherein the bore in said first two of said segments is threaded.

4. The assembly of claim 1 wherein the portion of said segments which interfaces with the shaft is threaded.

5. The assembly of claim 1 wherein:
(a) two of said segments have a body which defines at least part of the bore for the reception of the shaft, an external peripheral surface, and an external flange in which one of said grooves is formed and
(b) the other two of said segments each have an internal peripheral surface which is sized, shaped, and positioned to mate with the external peripheral surface on said first two of said segments and one of said pairs of projecting tongues is sized, shaped, and positioned so that one of said projecting tongues from each of said other two of said segments is received in said groove in said flange on said first two of said segments.

6. The assembly of claim 1 wherein said projecting tongues and grooves are symmetrically spaced.

7. The assembly of claim 2 wherein said first two segments act as a nut and said other two of said segments act as a washer.

8. An assembly which may be mounted on a shaft without passing over the end of the shaft, said assembly comprising:
(a) two segments each of which has a body which defines part of a bore for the reception of the shaft and an external flange in which a groove is formed and
(b) two segments each of which have two external projections sized, shaped, and positioned so that one of said external projections from each of said second two segments is received in said groove in said flange on one of said first two segments and the other of said external projections from each of said second two segments is received in said groove in said flange on the other one of said first two segments, said second two segments each having a body which defines part of a bore for the reception of said bodies of said first two segments, thereby interlocking all four segments.

9. The assembly of claim 8 wherein the bore in said first two segments is threaded.

10. An assembly which may be mounted on a shaft without passing over the end of the shaft, said assembly comprising:
(a) two segments each of which has a body which defines at least part of a bore for the reception of the shaft, an external peripheral surface, and an external flange in which a groove is formed and
(b) two segments each of which have an internal peripheral surface which is sized, shaped, and positioned to mate with the external peripheral surface on said first two segments and two external projections sized, shaped, and positioned so that one of said external projections from each of said second two segments is received in said groove in said flange on each of said first two segments.

11. An assembly which may be mounted on a shaft without passing over the end of the shaft, said assembly comprising four segments each of which comprises:
(a) a body which defines at least part of a bore for the reception of the shaft and which has an axial groove in its peripheral surface and
(b) two axially projecting tongues sized, shaped, and positioned so that one of said tongues from two of said segments is received in the groove in each of said segments, thereby interlocking all four segments.

12. The assembly of claim 11 wherein the portion of said bodies which defines the bore for the reception of the shaft is threaded.

13. An assembly which may be mounted on a shaft without passing over the end of the shaft, said assembly comprising four segments each of which comprises:
(a) a body which defines at least part of a bore for the reception of the shaft;
(b) two flanges which project radially from said body and are axially spaced so that the external peripheral surface of said body and the adjacent circumferential sides of said flanges define a groove; and (c) two tongues which project axially from said flanges and which are sized, shaped, and positioned so that one of said tongues from two of said segments is received in the groove in each of said segments, thereby interlocking all four segments.

14. The assembly of claim 13 wherein the portion of said bodies which defines the bore for the reception of the shaft is threaded.

15. The assembly of claims 8 or 10 wherein said assembly comprises four of said last mentioned segments, two of which interlock with said first mentioned segments on one side thereof and two of which interlock with said first mentioned segments on the other side thereof.

* * * * *